United States Patent [19]

Lund

[11] 4,097,786
[45] Jun. 27, 1978

[54] LIMIT CONTROL APPARATUS

[75] Inventor: Bryant D. Lund, Salt Lake City, Utah

[73] Assignee: E-Systems, Inc., Dallas, Tex.

[21] Appl. No.: 696,601

[22] Filed: Jun. 16, 1976

[51] Int. Cl.² .................................................. F16K 31/02
[52] U.S. Cl. ..................................... 318/282; 251/133
[58] Field of Search .................. 318/282, 168, 467; 251/133, 134

[56] References Cited

U.S. PATENT DOCUMENTS 3,588,652  6/1971  Lewis ..................................... 318/282

Primary Examiner—Robert K. Schaefer
Assistant Examiner—Leonard W. Pojunas, Jr.
Attorney, Agent, or Firm—Robert V. Wilder

[57] ABSTRACT

An actuator control system includes a ballscrew type actuator for controlling the positioning of a valve device. A processing circuit is responsive to direction and drive signals for driving a synchronous stepper motor which is operatively coupled to the actuator. The processing circuit includes a switching device which applies a DC voltage to the motor windings to hold the valve position when it is not being driven. A limit sensing device provides a limit signal when the movable member of the actuator approaches a limit of travel. A limit control circuit responds to the limit signal to alternately reverse the direction signal applied to the processing circuit so long as that signal is representative of the direction in which the limit is being approached.

5 Claims, 6 Drawing Figures

LIMIT CONTROL APPARATUS

FIELD OF THE INVENTION

The present invention relates to limit control systems and more particularly to limit control circuits for use with digitally controlled driving systems.

CROSS REFERENCE TO RELATED APPLICATIONS

Subject matter disclosed but not claimed herein is disclosed and claimed in co-pending applications, Ser. No. 696,600 and 696,602 filed on even date herewith.

BACKGROUND OF THE INVENTION

In most systems, in which a mechanical element is driven by an electrical circuit, there is a need to sense when a limit of travel is reached in order to prevent damage to the equipment being controlled. In some systems, when a limit of travel is reached, the system is shut down and requires operator action in order to effect further operation of the system. Therefore, there is a need for a dynamic limit control apparatus for use in such systems which is operable to automatically sense when a limit of travel is reached and prevent further movement in that direction while allowing subsequent movement in the opposite direction.

Further, in many systems where mechanical limits which have heretofore been sufficient, the increased use of digital control circuits for controlling the movement of the mechanical element has also increased the reaction time and speed of operation. In such systems, mechanical limit switches are no longer tolerable and there is a need for a solid state electronic limit control circuit which is compatible with digital control signals.

Similarly, in many systems there is need for a limit control circuit which senses when the limit of travel is being approached rather than waiting until the limit is actually reached and risking damage to the equipment.

In many control systems, synchronous motors are used to drive the moving element. In those systems if a limit is encountered, the motor is likely to go out of synchronism and lose its driving torque which, in turn, results in loss of position and control of the regulated element.

SUMMARY OF THE INVENTION

It is therefore an object of the present invention to provide a limit control apparatus which fulfills the above-noted needs.

It is another object of the present invention to provide a limit control apparatus as set forth which is solid state and not mechanical in nature.

It is a further object of the present invention to provide a limit control apparatus as set forth which is dynamic and automatically senses the imminence of a limit of travel thereafter preventing further movement in that direction while not inhibiting commanded movement in the opposite direction.

It is still another object of the present invention to provide a limit control apparatus as set forth which is highly responsive and compatible with digital control technology.

In accomplishing these and other objects, there has been provided, in accordance with the present invention, a limit control apparatus for use with a digitally controlled motor-driven mechanical element which includes sensing devices operable to sense when the mechanically driven element approaches a limit of travel to provide limit detection signals to a limit control logic circuit. The logic circuit includes integrating and comparison means for providing limit signals whenever a detection signal exceeds a predetermined amount. The limit signals are applied to logic circuitry which also receives a direction signal representative of the direction in which the controlled element is to be driven. The logic circuitry provides an output direction signal which alternately reverses the input direction signal so long as that signal is representative of the direction in which the limit is being approached.

BRIEF DESCRIPTION OF THE DRAWINGS

A better understanding of the present invention may be had from the following description when read in connection with the accompanying drawings in which.

DETAILED DESCRIPTION OF THE PREFERRED EMBODIMENTS

Figure 1:
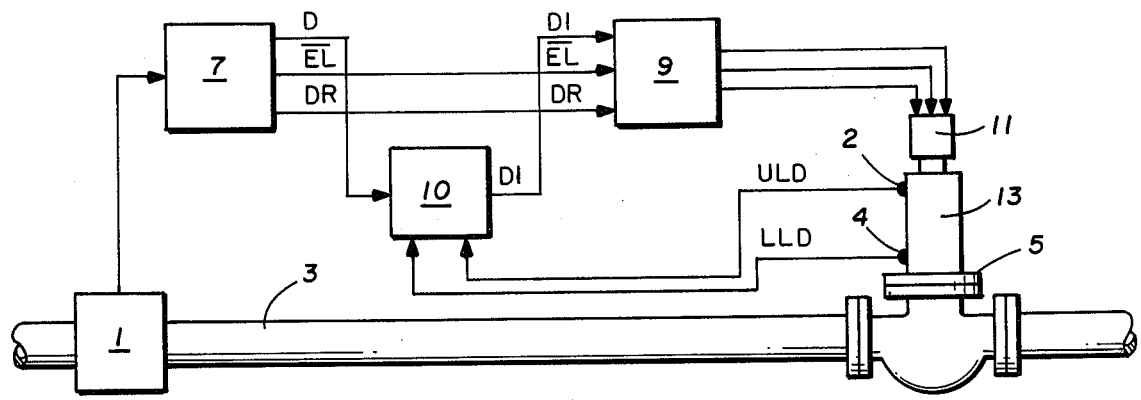
FIG. 1 is a schematic representation of an exemplary flow control system in which the present invention may be utilized.

In FIG. 1, a flow meter 1 monitors the flow within a conduit 3. The conduit 3 passes through a valve member 5. In the exemplary system of FIG. 1, the controlled variable is the flow of the fluid within the conduit 3 and the signal representative of the sensed flow at the flow meter 1 is applied to a process computer-controller 7. The process computer-controller 7 compares the detected flow signal with a pre-set or dialed-in flow magnitude and provides signals to a processing circuit 9 and a direction command signal to a limit circuit 10. The processing circuit 9 in turn applies several control signals to a motor 11 which operates an actuator 13. The actuator 13 is operatively coupled to the valve 5 to control the movement of a flow control or regulated element of the valve 5.

An actuator limit control circuit 10 is arranged to receive an input Drive signal D from the computer-controller 7 and provide an output Direction signal D1 for application to the processing circuit 9. Further, the limit control circuit 10 receives an Upper Limit Detection signal ULD and a Lower Limit Detection signal LLD from sensors 12 and 14, respectively, which are mounted on the actuator 13. The sensors 12 and 14 in the present example are piezoelectric crystals sensitive to mechanical vibrations to provide electrical output signals. Those sensors are epoxied on the structure of the actuator 13 with the Upper Limit Sensor 12 epoxied in the proximity of the upper limit of travel of the movable member in the actuator 13 and the Lower Limit Sensor 14 being epoxied on the lower portion of the actuator 13 in proximity to the lower limit of travel of the movable actuator member. The actuator limit control circuit 10 conditions the Drive signal D in response to the Upper and Lower Limit Detection signals to provide the modified of limit conditioned Drive signal D1 as hereinafter explained. It should be noted that the sensors 12 and 14 may also be strain-gate sensors or any other means for providing electrical signals when the movable member of the actuator 13 approaches either the upper or lower limits of travel.

Figure 2:
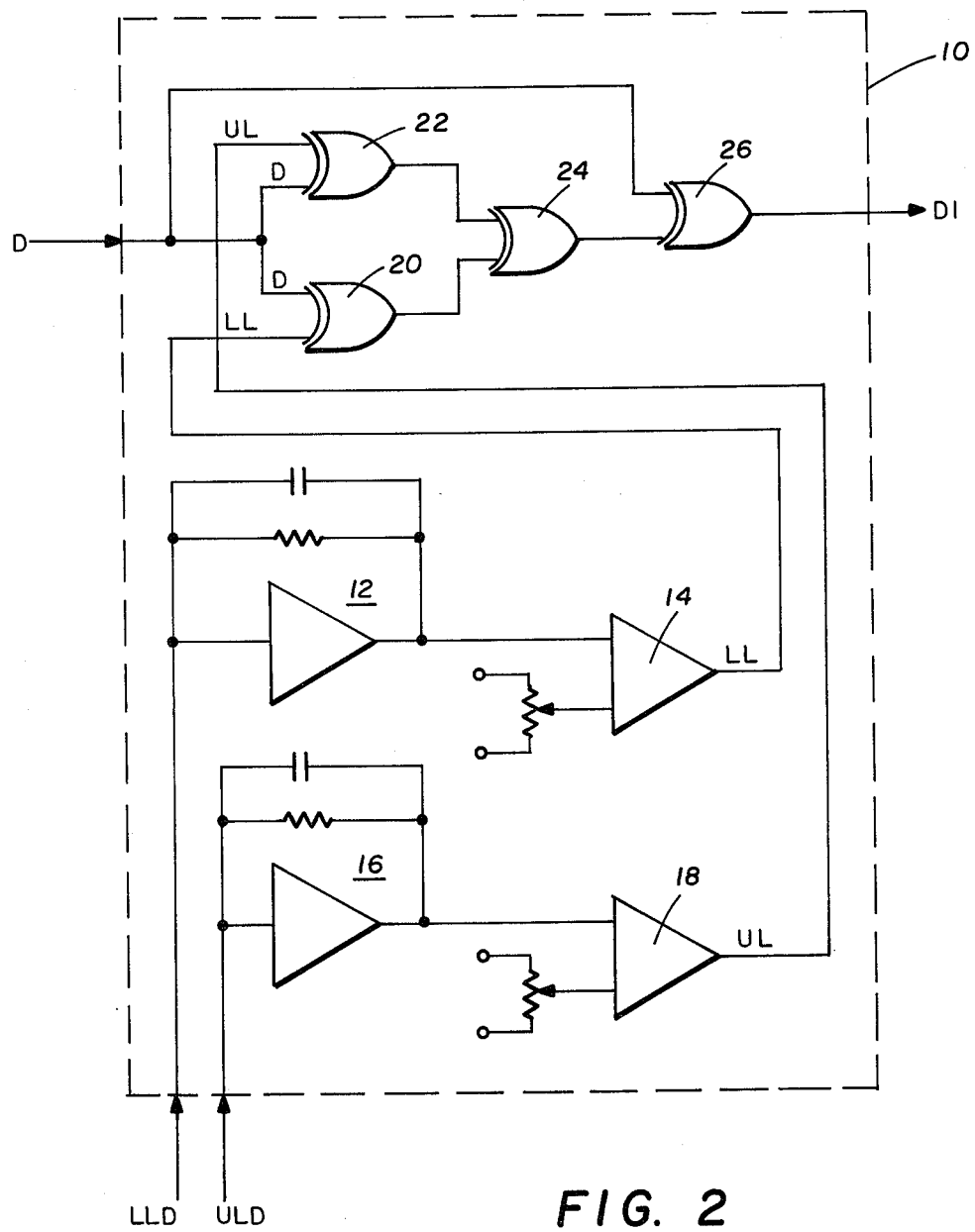
FIG. 2 is a schematic diagram of the limit control circuitry shown in FIG. 1.

FIG. 2 shows an exemplary embodiment of the limit control circuit 10 shown in FIG. 1. The Lower Limit Detection signal LLD is applied to a first integrating circuit generally shown at 12. The integrating circuit 12 receives the input signal LLD and provides an output signal which is applied to a comparator 14. A second integrating circuit 16 receives the input signal ULD and provides an output signal which is, in turn, applied to a second comparator 18. The comparators 14 and 18 compare the input signals thereto with a predetermined level to provide the Lower Limit signal LL and the Upper Limit signal UL, respectively, when the integrated sensed signals exceed the predetermined level.

The Lower Limit signal LL is applied to one input terminal of a two-input exclusive OR gate 20 while the Upper Limit signal UL is applied to one input terminal of a second two-input exclusive OR gate 22. The other input terminal of each exclusive OR gate 20 and 22 receives the controller-originated Direction signal D. The outputs from the gates 20 and 22 are applied to the input terminals of another exclusive OR gate 24. The output of the gate 24 is connected to one input terminal of another exclusive OR gate 203 the other input terminal of which is arranged to receive the controller-generated Drive signal D. The output terminal of the exclusive OR gate 26 provides the limit conditioned Direction signal D1 which is applied to the processing circuit 9 as shown in FIG. 1.

Figure 3:
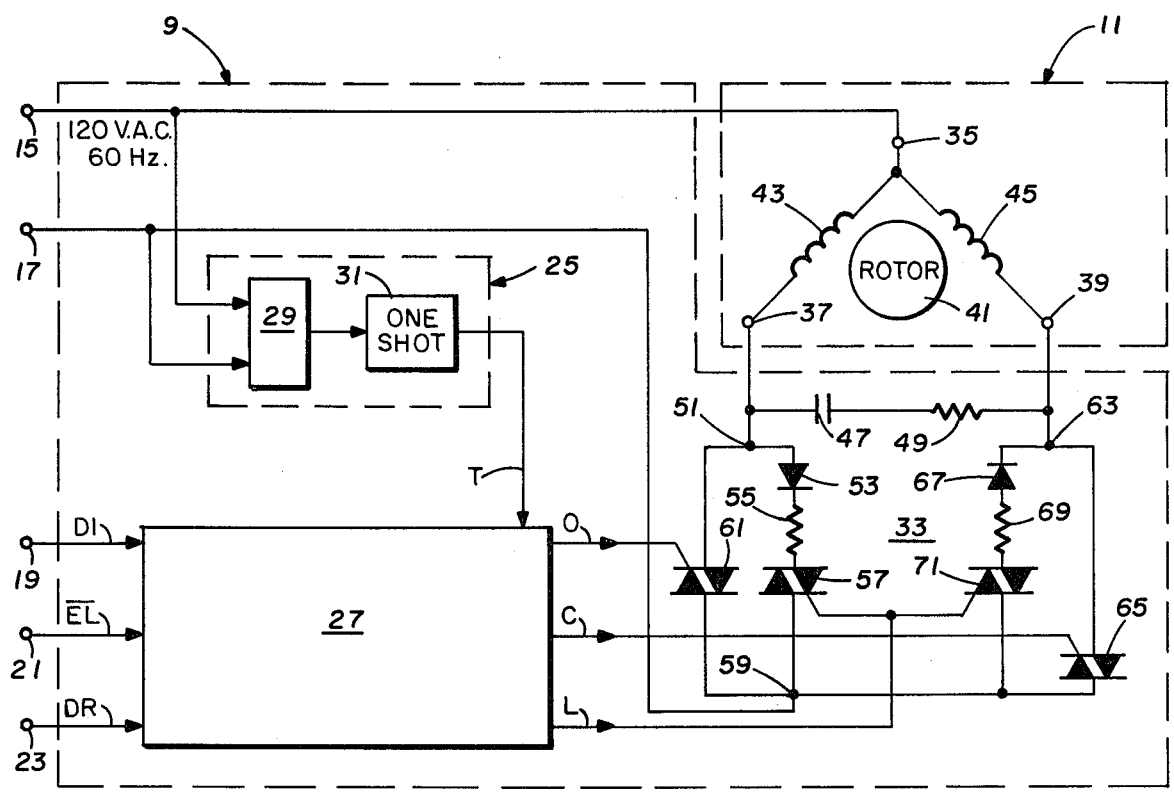
FIG. 3 is a schematic diagram of a portion of the circuitry shown in FIG. 2.

FIG. 3 shows a schematic diagram of the processing circuit 9 and its connections to the terminals of the motor 11. A 60 Hz AC power signal is applied at terminals 15 and 17 of the processing circuit 9. The controller provides an External Lock signal $\overline{EL}$ and a Drive signal DR at terminals 21 and 23 of the processing circuit 9. The limit conditioned Direction signal D1 is recived at terminal 19 and indicates in which of two directions the regulated element is to be moved. For example, if there is a logic 1 on the line designated D1, the controlled element within the valve 5 is to move in the direction D1 or, for example, in a downward direction. Similarly, if there is a logic 0 level on the line D1, the regulated element within the valve 5 is to move, for example, in an upward or open direction. D1 may represent either upward or downward movement in an application of the present invention but for purposes of illustration, D1 represents a downward movement in the exemplary embodiment. The External Lock signal $\overline{EL}$ indicates that the rotor should be locked in place notwithstanding any other signal. The Drive signal DR represents a command from the computer-controller 7 to effect a rotation of the rotor in accordance with the Direction signal D1. In the present example, a logic 1 level is indicative of a true statement as represented by approximately a +12 volt DC signal while a logic 0 or false level is represented by a 0 voltage level. Thus, if it is desired to move the regulated element downwardly, D1 will be at a logic 1 level, DR will be at a logic 1 level, and $\overline{EL}$ will be at a logic 1 level (indicating that the statement that there is not an external lock condition is true).

A zero-crossing switch 25 receives the 60 Hz power signal and provides the Timing signal T to a logic circuit 27. The logic circuit 27 also receives the Direction signal D1, External Lock signal $\overline{EL}$ and Drive signal DR. The zero-crossing switch 25 includes a bi-stable switching element 29 and a one-shot multivibrator 31. Timing signal T in the present example, is a positive going pulse generated each time the power signal crosses the 0 voltage level, i.e., 120 times per second. The logic circuit 27 provides an Open signal O, a Close signal C and a Lock signal L for application to a switching device generally indicated at 33. The motor 11 has three terminals 35, 37 and 39 for connection to external circuits. The terminal 35 in the present example is directly connected to the power line applied to the input terminal 15 of the processing circuit 9. The motor comprises a rotor 41 and first and second field windings 43 and 45, respectively. The winding 43 is connected between terminals 35 and 37 and the winding 45 is connected between terminals 35 and 39. The terminals 37 and 39 are connected through a phase-shifting network, comprising capacitor 47 and resistor 49, to the switching device 33. The switching device 33 is arranged to selectively couple the terminals 37 and 39 to the other side of the power line connected to terminal 17 in response to the control signals O, C, and L.

More specifically, the motor terminal 37 is connected to a first common point 51. The first common point 51 is connected to the anode terminal of a diode 53 the cathode terminal of which is connected through a resistor 55 to one switching terminal of a triac 57. The other switching terminal of the triac 57 is connected to a second common point 59 which is in turn connected to the second power lead from the input terminal 17 of the processing circuit 9. Another triac 61 is also connected in parallel between the common terminal 51 and the common terminal 59. The triac 61 has a control terminal connected to the logic circuit 27 for receiving the Open control signal O. The motor terminal 39 is connected to a third common terminal 63 of the switching device 33. Common terminal 63 is connected through a triac 65 to the second common terminal 59 and has its control terminal connected also to the logic circuit 27 for receiving the Close control signal C. The common terminal 63 is connected to the cathode terminal of a diode 67 and the terminal of which is connected through a resistor 69 to one switching terminal of a triac 71. The other switching terminal of the triac 71 is connected to the common point 59. The control terminals of the triac 57 and 71 are arranged to receive the Lock signal L.

The signals D, $\overline{EL}$ and DR which are provided by the process computer-controller 7 may be readily derived from many process computer-controllers on the market. Their only requirements in the present example are as follows: D remains at a logic 1 level so long as the regulated element is to move in a first direction and changes to a logic 0 level when the direction of travel is to be reversed; $\overline{EL}$ remains high when there is no external condition requiring that the rotor be locked in place and changes to a logic 0 level when such an external condition appears; and the DR signal is a train of pulses with each pulse representing a desired rotor movement of a predetermined amount.

Figure 4:
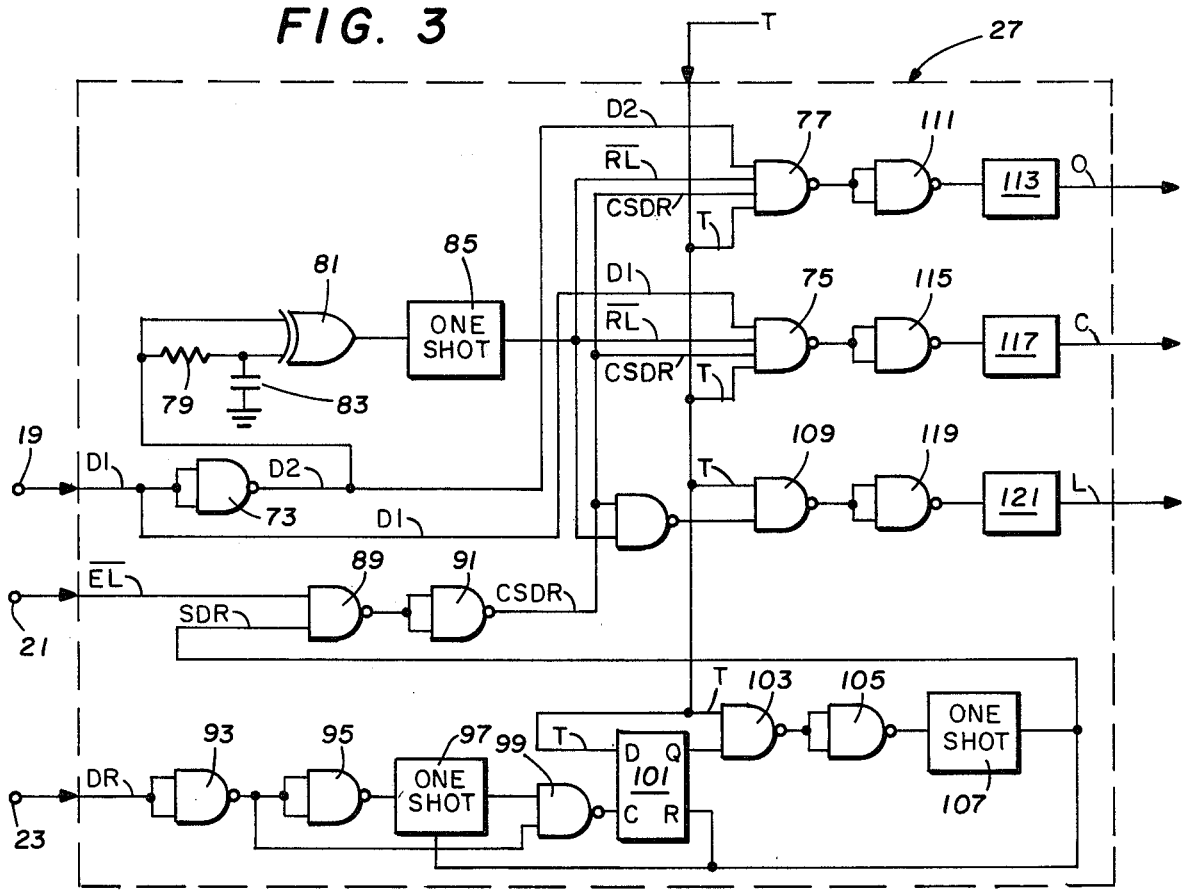
FIG. 4 is a detailed drawing of the logic circuit shown in FIG. 3.

FIG. 4 shows the details of the logic circuit 27. The input terminal 19 is connected to both input terminals of a NAND gate 73. Input terminal 19 is also connected to one input terminal of a four-input NAND gate 75. The output terminal of the gate 73 is connected to one input terminal of another four-input NAND gate 77. The gate 73 output is also connected through a resistor 79 to one input terminal of an exclusive OR gate 81. That input terminal of the gate 81 is also connected through a capacitor 83 to a common reference potential. The output terminal of the gate 73 is also connected directly to a second input terminal of the gate 81. The output terminal of the gate 81 is connected to a one-shot multivibrator 85 which provides a Reverse Lock output signal $\overline{RL}$. As hereinafter explained in connection with the operation of the described system, the signal $\overline{RL}$ is generated, i.e., assumes a logic 0 level, whenever the Direction signal D1 changes states. The $\overline{RL}$ signal is applied to one input terminal of gates 75 and 77. The $\overline{RL}$ signal is also applied to one input of a two-input NAND gate 87.

The input terminal 21 of the logic circuit 27 is connected to one input terminal of a two-input NAND gate 89. The output of the gate 89 is applied to an inverting NAND gate 91 which provides a Conditioned Synchronized Drive signal CSDR which is applied to the other input of the gate 87 and also to one input of each of gates 75 and 77. The other input of the NAND gate 89 is provided by a synchronization circuit to which the input terminal 23 is connected. The input terminal 23 provides the Drive signal DR which is applied to both input terminals of a NAND gate 93. The output of the gate 93 is applied to both input terminals of another NAND gate 95 the output terminal of which is connected to a one-shot multivibrator 97. The one-shot multivibrator 97 provides an output which is connected to one input terminal of a NAND gate 99 the other input terminal of which is connected to the output terminal of the gate 93. The output terminal of the gate 99 is connected to a bi-stable switching device 101 which also receives the Timing signal T from the zero-voltage switch 25 as shown in FIG. 3. The device 101 has two output terminals one of which is connected to one terminal of a two-input NAND gate 103. The other input terminal of the gate 103 receives the Timing signal T. The other output of the device 101 is connected back to the output of the multivibrator 97. The output of the gate 103 is applied to both input terminals of a NAND gate 105, the output of which is connected to another one-shot multivibrator 107. The output of the one-shot multivibrator 107 is connected back to the output of the one-shot multivibrator 97 and also provides the Synchronized Drive signal SDR which is applied to the other input terminal of the gate 89.

The Timing signal T from the zero-voltage switch 25 is applied to one input terminal of each of gates 75 and 77 and also to one input terminal of a NAND gate 109. The other input terminal of the gate 109 is connected to the output terminal of the gate 87. The output terminal of the four-input NAND gate 77 is connected to both input terminals of an inverting NAND gate 111, the output terminal of which is connected to the input of a current drive circuit 113. The current drive circuit 113 provides the logic output Open signal O which is applied to the gate terminal of the triac 61 as shown in FIG. 1. Similarly, the output terminal of the four-input NAND gate 75 is connected to both input terminals of an inverting NAND gate 115 and the output of the NAND gate 115 is connected to the input of another current drive circuit 117. The output of the current drive circuit 117 provides the Close signal C which is applied to the gate terminal of the triac 65 in the switching device of the processing circuit 9. The output terminal of the gate 109 is connected to both input terminals of an inverting NAND gate 119. The output terminal of the gate 119 is connected to a current drive circuit 121 which, in turn, provides the Locking signal L. As shown in FIG. 2, the Locking signal L is applied to both gate or control terminals of triacs 57 and 71 shown in FIG. 3.

Figure 5:
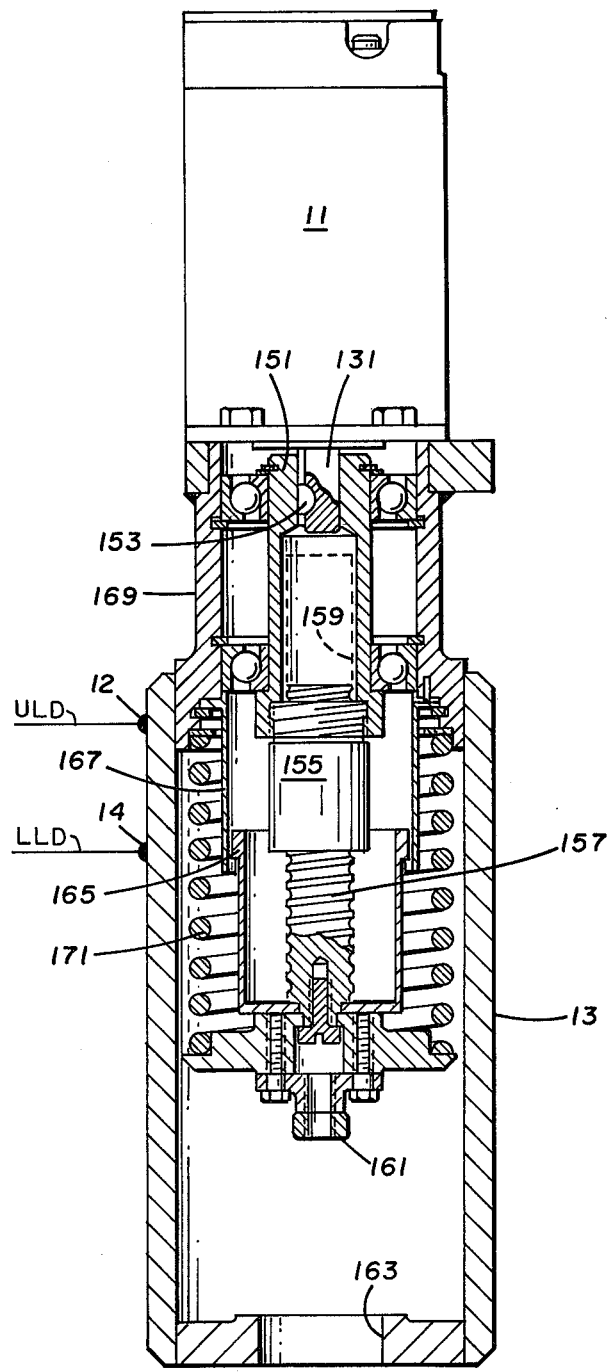
FIG. 5 is a cross-sectional view of an actuator device used in connection with the disclosed control system.

FIG. 5 shows one arrangement for the actuator 13 which has the motor 11 mounted thereon.

In FIG. 5, an exemplary embodiment of the actuator assembly 13 is shown. The motor shaft 131 is keyed to a coupler 151 by means of a keying device 153. The coupler 151 is connected to a ballscrew nut 155 in such a manner that a rotation of the motor shaft 131 effects rotation of the ballscrew nut 155. A ballscrew 157 is coupled to the ballscrew nut 155 and is free to traverse up and down within the area 159 as the ballscrew nut 155 is rotated. The ballscrew 157 is variously coupled to an actuator stem 161 which is arranged for connection to a regulated element of the valve 5 (not shown) through an opening 163 of of the actuator assembly 13 of FIG. 5. A plurality of tabs 165 provide an anti-rotation device for restraining the ballscrew from rotation. The tabs 165 run in slots along an extension 167 of the actuator housing and yoke 169. A spring 171 is provided to fail-safe close the actuator whenever the motor 11 does not provide holding torque or is not driven in one direction or the other.

The ballscrew and ballscrew nuts of the actuator shown in FIG. 5 provide substantially reduced friction to enable more accurate control of the regulated element of the valve 5 through the stepping operation of the synchronous motor 11 as hereinafter noted.

Figure 6:
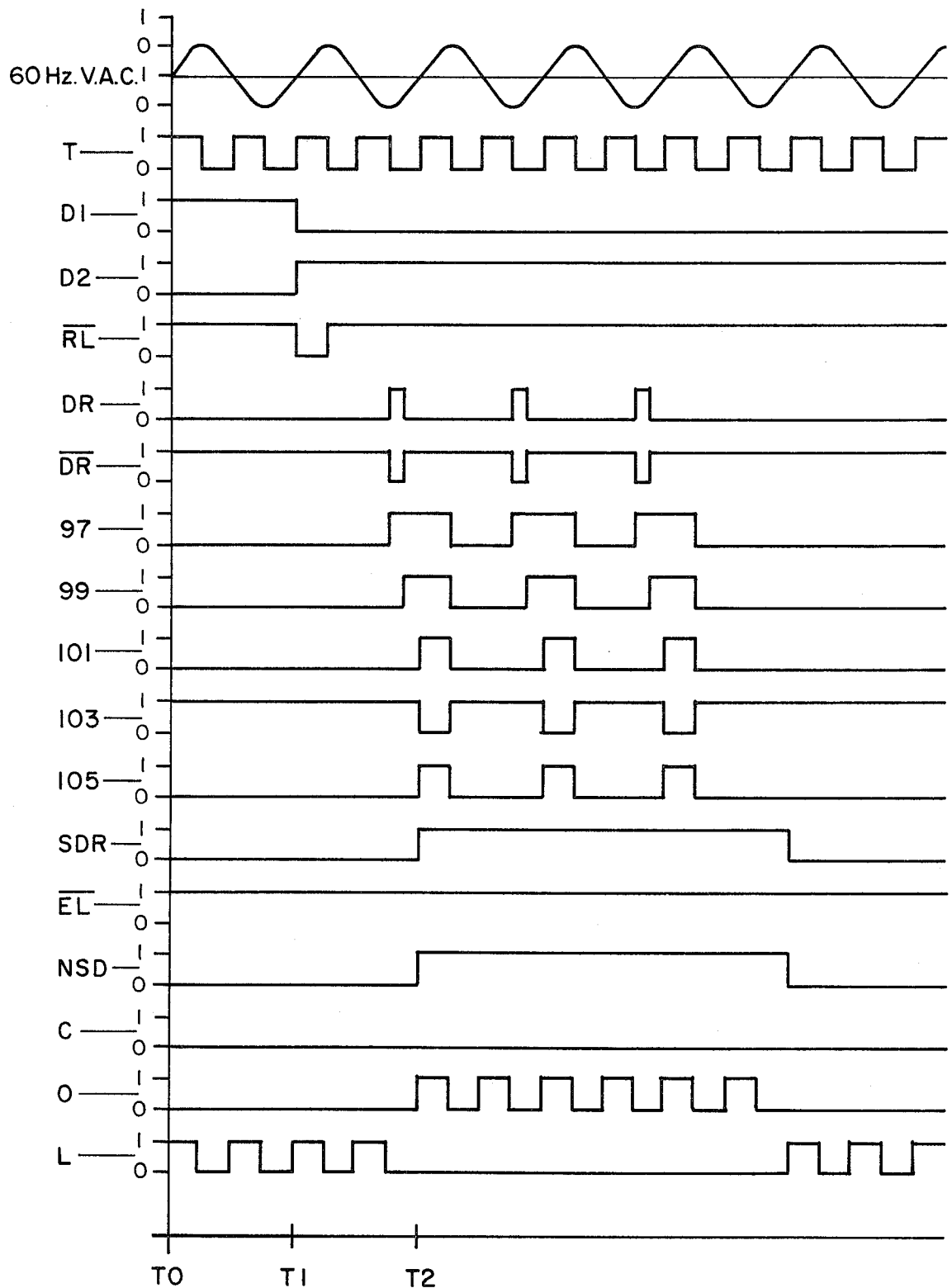
FIG. 6 is a timing chart useful in explaining several operational features of the disclosed system.

In operation, a 120 AC 60 Hz power signal is applied to terminals 15 and 17 of the processing circuit 9. That voltage is applied to the zero-voltage switch 25 which provides the Timing signal T. The one-shot multivibrator 31 actually delays its output signal by approximately 20° so that it is synchronized with the voltage applied to the field coils since there is a 20° inherent lag due to the inductive loading of the coils. However, for purposes of explanation, the 60 Hz power signal and the Timing signal T are shown in synchronism beginning at T0 on the abscissa of the timing chart shown in FIG. 6. Basically, a limit conditioned Direction signal D1 is provided by the limit control circuit 10 and a Drive signal DR are furnished by the computer-controller 7. In the present example, an external lock signal EL is also applied to the processing circuit 9. In FIG. 6 the Direction signal D1 is shown initially in the logic 1 or high state. In the present example, when the Direction signal D1 is at a logic 1 level, it will be assumed as hereinbefore noted that the regulated element within the valve 5 is to be driven in the downward or close direction. Conversely, when the Direction signal D2, which is the inverse of D1, goes high, the regulated element within the valve 5 is to be driven in the upward or open direction.

When all of the inputs to the NAND gate 77 are at a logic 1 level, its output will go to a logic 0 level. That signal is applied to a current drive circuit 113 to provide a positive going Open signal O. Similarly, when all of the inputs to the gate 75 are at a logic 1 level, the Close signal C will go to a logic 1 level to trigger the triac 65. It is noted that either the open gate 77 or the close gate 75 will be partially enabled at any one time since each receives as one of the inputs thereto inversely related direction signals. Thus, if the signal D2 is at a logic 1 level the open gate 77 may be enabled but the close gate 75 cannot be enabled since, necessarily, the Direction signal D1 will be at a logic 0 level thus precluding a low going output signal from the close gate 75.

Upon a change of states of the Direction signal D1, a Reverse Lock signal $\overline{RL}$ is generated by the one-shot multivibrator 85. The purpose of the $\overline{RL}$ signal is to lock the rotor for a predetermined period thereby enabling a smoother and more accurate transistion in changing directions. As shown in FIG. 6, at a time T1 for example, the Direction signal D1 reverses and goes from a high logic level to a low logic level. That reversal precipitates the generation of a Reverse Lock signal $\overline{RL}$ in the form of a negative going pulse as shown in FIG. 6. In the present example, the duration of the Reverse Lock signal is approximately 5 milliseconds. Since the Reverse Lock signal $\overline{RL}$ is applied to both Open and Close enable gates 77 and 75, neither an Open O or a Close C signal can be generated during the continuance of the $\overline{RL}$ signal, i.e., while the $\overline{RL}$ signal is at a 0 logic level.

The Drive signal DR is applied to terminal 23 of the control circuit 27 from the computer-controller 7. The Drive signal in the present example has a frequency of 60 Hz and is a positive going signal which may vary in duration from ten microseconds to five milliseconds. A filtering circuit (not shown) may be inserted between the input terminal 23 and the gate 93 to ground out noise signals that have a duration of less than ten microseconds. In FIG. 6, three Drive signal pulses are generated beginning at Time T2. The Drive pulses DR are inverted at gate 93 and again at gate 95 and applied to the one-shot multivibrator 97. The output of the multivibrator 97 is shown in FIG. 6 as the "97" signal. Whenever the Drive signal DR goes high, the multivibrator 97 will provide a high going pulse of a duration of approximately 8 milliseconds. The output of the one-shot multivibrator 97 is applied with the inverse of the Drive signal DR to the gate 99. The output of the gate 99 is shown in FIG. 6, and the Drive signals DR are synchronized with the Timing signal T through the flip-flop circuit 101, and the NAND gate 103 and inverted at the NAND gate 105. That signal is applied to a one-shot multivibrator 107 which provides a Synchronized Drive signal SDR which is a positive going pulse having a duration of approximately 16 milliseconds in the present example. As shown in FIG. 6, the Synchronized Drive signal SDR will remain high so long as sequential Drive signals are being received from the computer-controller 7.

The Synchronized Drive signal is applied to a NAND gate 89 along with the External Lock signal $\overline{EL}$. The External Lock signal $\overline{EL}$ will normally be at a logic 1 level, as shown in FIG. 6, unless a condition external to the circuit 27 requires that the regulated element in the valve 5 be stopped in which case the $\overline{EL}$ signal will drop to a logic 0 level. If no external conditions exist which would require the motor to be locked, $\overline{EL}$ will be at a high logic level. Therefore, while the Synchronized Drive signal SDR is at a logic 1 level, the Conditioned Synchronized Drive signal CSDR will also be at a logic 1 level thereby selectively allowing either gate 75 or gate 77 to be enabled depending upon which direction signal is present. Since, in the present example, at Time T2 the Direction signal D2 is at a logic 1 level, the CSDR signal may effect the opening of the regulated element in the valve 5 but not the closing thereof.

At the time the Conditioned Synchronized Drive signal CSDR is generated in the present example, the D2 signal as well as the $\overline{RL}$ signal are both at a logic 1 level and therefore the output of the open gate 77 will vary with the Timing signal T so long as all of the other inputs to the Open gate 77 remain at a logic 1 or high logic level. Thus, the Open signal O will vary as shown in FIG. 6 applying a series of positive going pulses to the control terminal of the triac 61.

In the absence of Drive signals DR, and assuming there is no external lock condition, the Conditioned Synchronized Drive signal CSDR applied to the gate 87 will remain at a low logic level. Therefore, regardless of the condition of the signal applied to its other input terminal, the output of the gate 87 will remain at a high logic level. The gate 109 will therefore be enabled to provide an inverted Timing signal T which is once again inverted at gate 119 and applied to a current drive circuit 121. The circuit 121 provides the Lock signal L in substantially concurrent timed relation with the Timing signal T whenever there are no Drive signals DR applied to the terminal 23.

When the Lock signal goes high as shown in FIG. 6, either triac 57 or triac 71 will be enabled to pass current therethrough. At time T0 when the Lock signal L goes high the power signal applied to the motor coils is beginning a positive half cycle. Therefore, the triac 57 will be enabled and current will flow through the diode 53, resistor 55 and triac 57 completing a circuit to the motor coils. The next positive going Lock signal pulse appears when the power signal is beginning a negative half cycle and therefore triac 71 will be enabled and current will flow through the diode 67, resistor 69 and triac 71. Diodes 53 and 67 thus act as a rectifying device operable to rectify the AC voltage applied to the field windings of the motor 11 thereby providing for the application of a DC voltage level to the field coils whenever the Locking signal L is generated. Thus, the Locking signal L effects the locking of the motor shaft in place thereby establishing the holding torque sufficient to overcome the force of the spring or biasing device 171 in FIG. 5 and holding the regulated element within the valve 5 in situ at the position to which it was last moved.

However, upon the generation of a subsequent Drive pulse, and again assuming no external lock condition exists, the CSDR signal will go to a logic 1 level. Assuming that there has been no change in the direction signal, the output of the gate 87 will go to a logic 0 level thus disabling the gate 109 and holding the Lock signal L at a logic 0 level as shown in Time T2 in FIG. 6. The Open signal O will go to a logic 1 level thereafter as shown in FIG. 6 thus enabling conduction through the triac 61. At that time the power signal is beginning a positive half cycle and the triac 61 will begin conducting. When the power signal next crosses the zero axis, the Open signal again goes positive thereby enabling the maintenance of conduction through triac 61. That process as seen in FIG. 6 is repeated to allow the motor to rotate in response to three complete power signal cycles for example. Each cycle represents a step and therefore the motor is rotated three steps in response to the receipt of the three Drive signal pulses. Thereafter, the Drive signal DR will stay at a logic 0 level and the CSDR signal will again return to the logic 0 level thereby again effecting the enabling of the gate 109 and the resumption of the application of the Locking signal L to hold the motor shaft, and accordingly the regulated element within the valve 5, in place.

With the system as described but without any limit control for the movement of the actuator in controlling the regulated element of the valve 5, there is the possibility that the actuator member i.e., ballscrew 157 in FIG. 5, may be driven against its upper or lower mechanical limits. In that event, it is likely that the actuator will fall out of synchronization and lose driving or holding torque in which case the action of the biasing means 145 or 171 will force the movable member of the actuator 13 to its downward limit and close off the valve 5. The actuator limit control circuit 10 as shown in FIGS. 1 and 2 is therefore provided to sense when the actuator element approaches either upper or lower limits of travel at which time the actuator limit control circuit is operable to effect oscillation at either the upper or lower limit until the direction signal forcing it into that limit reverses itself thereby commanding movement away from that limit.

For purposes of explanation it will be assumed that the controller generated Direction signal D is at a logic 1 level i.e., commanding the actuator to move in the downward direction. It will be further assumed that the Direction signal D maintains logic 1 level and the ballscrew is beginning to engage its lower limit. At that point in time, the lower limit piezoelectric sensor 14 begins to sense the strain effected within the actuator 13 as a result of the ballscrew 157 engaging its lower limit. The sensor 14 will then generate pulses representative of the detected strain and those pulses are applied to the integrating circuit 12 within the actuator limit control circuit 10. The integrating circuit 12 integrates those pulses and compares that integrated level with a predetermined voltage. When the predetermined level is exceeded, the comparator 14 will generate a positive going pulse on the line carrying the Lower Limit signal LL. The resistor and capacitor associated with the integrating circuits 12 and 16 are sized so that the duration of the integral signal exceeding the predetermined level will be only momentary and approximately of the duration of one driving pulse DR.

It should be noted that in the absence of a Upper Limit signal UL or a Lower Limit signal LL, the Direction signal D from the computer-controller 7 will be passed intact through the actuator limit control circuit 10 and be applied to the processing circuit 9 as the limit conditioned Direction signal D1. Without an Upper Limit UL or Lower Limit LL signal, if the Direction signal D is at a logic 1 level, both gates 20 and 22 will provide a logic 1 output and the gate 24 will therefore provide a logic 0 output. Since the Direction signal D is at a logic 1 level the output from the gate 26 will also be at a logic 1 level and the Direction signal D1 will be the same as the controller-generated Direction signal D. Similarly, if there are no Upper Limit or Lower Limit signals, i.e., both UL and LL are at a logic 0 level, and the controller generated Direction signal D is at a logic 0 level representative of a command to move in the upward direction, both outputs from gates 20 and 22 will be at a logic 0 level in which case the output from the gate 24 will also be at a logic 0 level. Since the controller-generated Direction signal D is at a logic 0 level, the output of the gate 26 will also be at a logic 0 level and the processor Direction signal D1 will be the same as the controller-generated Direction signal D.

However, when, for example, a Lower Limit signal is present, i.e., when the Lower Limit signal LL goes to a logic 1 level, the Direction signal D1 applied to the processing circuit 9 will be opposite to the Direction signal D provided by the computer-cntroller 7 so long as one of the limit signals is at a logic 1 level. For example, assuming that the Direction signal which is applied to the limit control circuit 10 from the computer-controller 7 is at a logic 1 level and there is a Lower Limit signal present, i.e., LL is also at a logic 1 level, the output of the gate 20 will be at a logic 0 level. Since there is no Upper Limit condition and the Upper Limit signal UL is at a logic 0 level, the output from the gate 22 will be at a logic 1 level. With those inputs, the output of the gate 24 will be at a logic 1 level and when that signal is combined with the controller-generated Direction signal D also at a logic 1 level, the output gate 26 i.e., the Direction signal D1, will be changed to a logic 0 level. When D1 goes to a logic 0 level the next drive pulse received by the processing circuit 9 will effect movement of the ballscrew 157 for example in the upward direction thereby disengaging the ballscrew's lower limit of travel. Following that operation, and because of the design of the integrating circuit 12, the Lower Limit signal LL will again return to a logic 0 level and the Direction signal applied to the processing circuit 9 will again be the same as the controller-generated Direction signal D. If the controller-generated Direction signal D continues to command movement in the downward direction, the ballscrew 157 will again move in the downward direction with the next received drive signal DR, encountering its lower limit of travel and initiating the limiting function of the limit control circuit 10, as hereinbefore described. The operation of the upper limit portion of the limit control circuit 10 is similar to that described in connection with the Lower Limit signal LL. Thus, instead of the actuator movable member driving itself into an upper or lower limit and losing synchronization and driving or locking torque, the present invention is operable to detect when the movable member of the actuator 13 approaches one of its limits and, in effect, reverses the commanded direction for subsequent alternate drive pulses which would otherwise command continued movement in the same direction. That operation, in effect, allows the regulated element within the valve 5 to substantially remain at either its upper or lower limit without losing synchronization until the direction signal from the computer-controller 7 is reversed at which time the regulated element will move in the opposite direction in accordance with subsequently received Drive signals DR.

The embodiments of the present invention in which an exclusive property or privilege is claimed are defined as follows:

1. For use in a control system wherein a processing circuit is operable to receive a commanded direction signal and selectively effect movement of an actuator in accordance therewith subject to a first limit ot travel in a first direction, the combination comprising:

first limit sensing means connected to the actuator and operable to generate a first limit detection signal characterized by at least one electrical pulse, when the actuator approaches the first limit of travel;

integrating means arranged to receive said first limit detection signal and provide a first integral signal output;

comparator means arranged to receive said first integral signal output and provide a first limit signal when said first integral signal output exceeds a predetermined level; and logic means arranged to receive said first limit signal and the commanded direction signal, said logic circuit being operable to provide a modified direction signal to the processing circuit, said modified direction signal being indicative of the commanded direction in the absence of said first limit signal, said logic means being operable to modify said commanded direction signal upon receipt of said first limit signal such that said modified direction signal is indicative of the direction opposite said commanded direction during the continuance of said first limit signal.

2. The combination set forth in claim 1 wherein said first limit sensing means comprises a mechanically responsive electrical sensor mounted on the actuator in proximity to the actuator limit of travel in the first direction.

3. The apparatus as set forth in claim 2 wherein said first limit sensing means includes a piezoelectric device.

4. The combination as set forth in claim 2 wherein said first limit sensing means comprises a strain guage device.

5. The combination as set forth in claim 1 wherein the processing circuit is further selectively responsive to the commanded direction signal to effect movement of the actuator in a second direction subject to a second limit of travel, said limit sensing means being operable to generate a second limit detection signal characterized by at least one electrical pulse when the actuator approaches the second limit of travel, said integrating means being arranged to receive said second limit detection signal and provide a second integral output signal, said comparator means being operable to receive said second integral output signal and provide a second limit signal when said second integral output signal exceeds a predetermined level, said logic means being further operable to receive said second limit signal, said modified direction signal being indicative of the commanded direction in the absence of either first or second limit signal, said logic means being operable to modify said commanded direction signal upon receipt of said first or second limit signals to effect actuator movement in the direction opposite said first or second directions during the continuance of said first or second limit signals, respectively.

* * * * *